Dec. 3, 1957  G. M. STAMPS  2,815,397
FACSIMILE APPARATUS
Filed Feb. 28, 1955  2 Sheets-Sheet 2
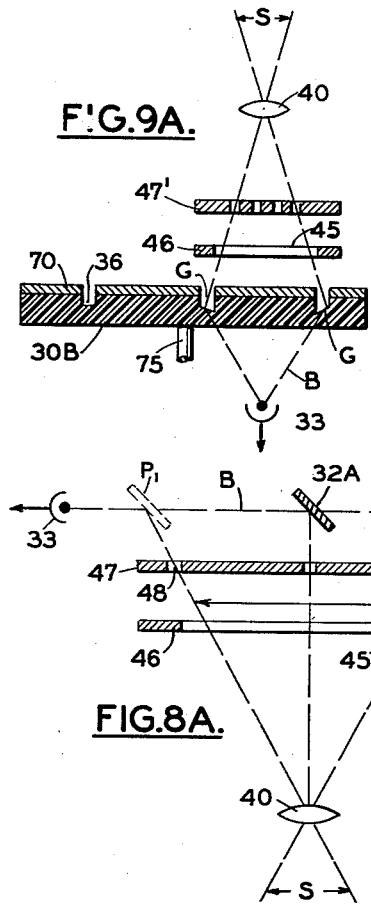
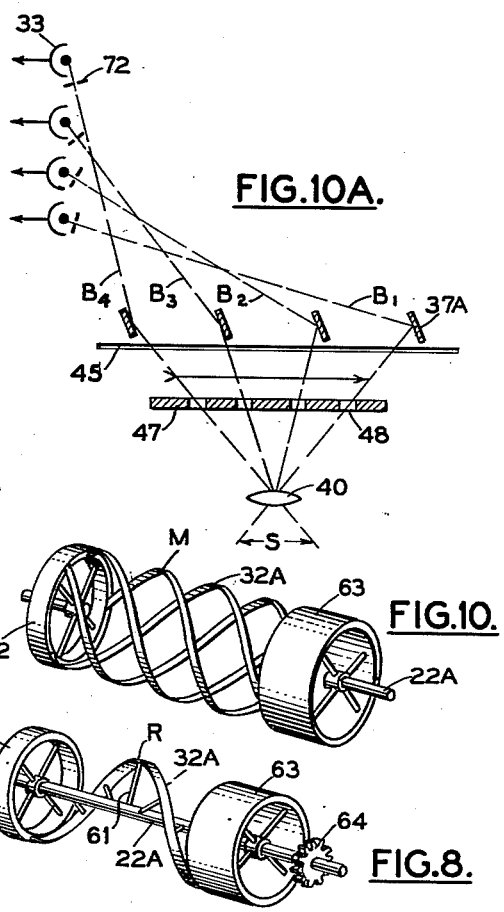
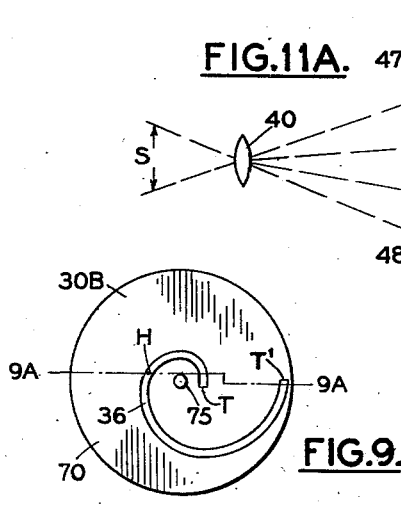
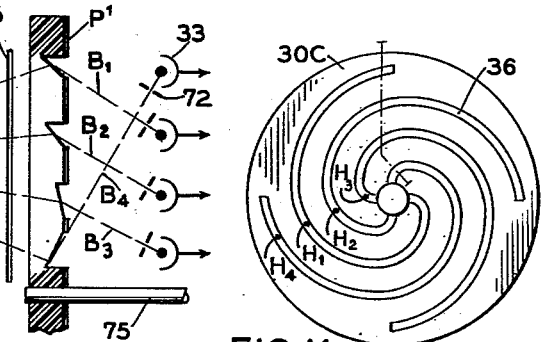
INVENTOR.
GEORGE M. STAMPS
BY J. B. Burke
ATTORNEY United States Patent Office 2,815,397
Patented Dec. 3, 1957

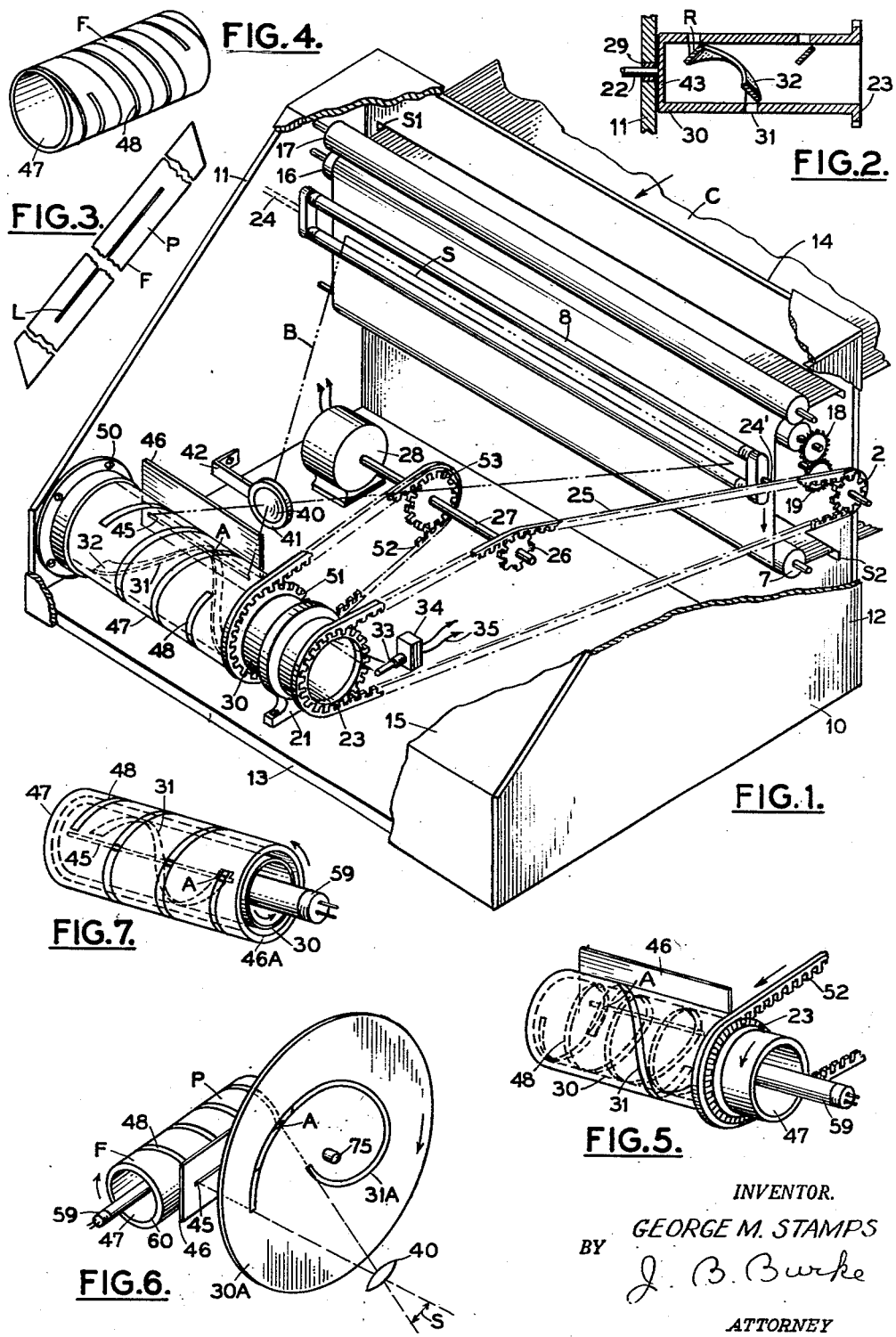

2,815,397
FACSIMILE APPARATUS

George M. Stamps, New Hyde Park, N. Y., assignor to Faximile, Inc., New York, N. Y., a corporation of Delaware Application February 28, 1955, Serial No. 490,928

19 Claims. (Cl. 178—6.6)

This invention relates to the art of facsimile apparatus and particularly concerns a novel continuous scanning device for use in transmitting electrical signals representative of graphic copy.

In my copending patent applications 291,144 filed June 2, 1952 and 419,474 filed March 30, 1954, I describe several continuous scanning systems. In each of these systems there are provided two associated scanning members. One member is a stationary flat opaque film or plate having a straight opening in the form of a narrow slit or window about 0.002 inch in width, and the other member is a flat rotatable opaque disk or plate having a narrow slit or window also about 0.002 inch wide in the form of a continuous Archimedean spiral. The members are so disposed that the narrow windows intersect to define a small moving quadrilateral scanning aperture moving repeatedly in the direction of the straight window. The members are spaced predetermined distances from a graphic copy sheet to be scanned. An optical system is disposed between the copy and the scanning members. Mechanical means are provided to move the copy sheet continuously as the rotatable member is rotated. A photocell is disposed to receive light reflected from a scanned line on the copy via the scanning aperture. Suitable lenses and mirrors are disposed in the optical path between photocell and copy. The rotatable scanning member may be cylindrical in form and have a helical slit or window. The spiral window may have a plurality of turns so that the straight window is intersected several times to define a plurality of scanning apertures. A turn-selecting element in the form of an opaque disk or plate having a single turn continuous spiral slot is then provided to rotate in coordination with the multiturn window so that only a single scanning aperture is exposed to the light receiving photocell.

In the present invention the scanning system includes a cylindrical scanning member with a multiturn continuous helical slit or window. A turn selecting element is provided which may also serve as a light collector to direct light from the scanning aperture to a photocell. The turn selector-light collector includes a continuous helical mirror. In another embodiment the selector-collector includes a continuous one turn flat spiral lens. The selector-collector may include a plurality of continuous one turn helical mirrors or flat spiral lenses to pass light rays from a plurality of scanning apertures to a plurality of photocells.

The benefits obtained in improved fidelity of recorded copy by employing a multiturn scanner element having a multiturn window with a turn selector member are described in detail in my copending applications above mentioned. The improvement in definition over a corresponding system employing a scanner member with a single turn spiral or helical window and without a turn selector is almost directly proportional to the number of turns in the multiturn scanner member. The present invention provides among others the advantages over the prior scanner systems disclosed by me of a simplified optical system and more compact scanner member assembly. Also the present invention is readily adapted to a color facsimile system as is described below.

It is therefore a principal object of the invention to provide a continuous scanning system for facsimile transmitting or recording apparatus in which a rotatable cylindrical scanning member carries a multiturn helical slit or window for cooperation with a stationary member having a straight linear slit or window.

It is a further object to provide a scanning system which includes a scanning member having a multiturn spiral window and a turn selector which also serves as a light collector. It is a further object to provide for use in a scanning system a light collector in the form of a helical mirror or spiral lens.

It is a further object to provide a scanning member in the form of an opaque hollow cylindrical member having a helical slit.

It is a further object to provide a scanning system employing a member having a multiturn spiral window in association with one member having a straight window and another member serving as a turn selector-light collector.

It is a further object to provide a scanning system employing a member having a multiturn spiral window in association with a member having a straight window and with a turn selector-light collector including a plurality of helical mirrors or spiral lenses.

It is a further object to provide a scanner assembly adapted for use in a color facsimile system.

Other and further objects and advantages of the invention will become apparent from the following description taken together with the drawings, wherein:

Fig. 1 is an isometric view of a scanning device embodying the invention.

Fig. 2 is a central longitudinal section of the turn selector-light collector member employed in the scanning device.

Fig. 3 shows a film strip which may be used in making a cylindrical scanning member having a multiturn helical window.

Fig. 4 shows the scanning member made with the film strip of Fig. 3.

Fig. 5 shows another scanning device according to the invention.

Figs. 6, 7 show other arrangements of scanning members.

Fig. 8 shows another form of selector-collector including a single turn helical mirror.

Fig. 9 shows another form of selector-collector including a single turn flat spiral lens.

Fig. 10 shows another form of selector-collector including a plurality of helical mirrors.

Fig. 11 shows another form of selector-collector including a plurality of flat spiral lenses.

Figs. 8A, 9A, 10A, 11A are diagrams useful in explaining the operation of the several scanning devices and scanning members.

In Fig. 1 is shown a metal cabinet 10 including a base section having side walls 11, 12, a base 13 and rear wall 14. A cover 15 is provided which attaches to the base section so that the scanner operates in the compartment formed by the base section and cover. Slots $S_1$ and $S_2$ are provided for continuous entry and exit of a copy sheet C into and out of the compartment. The copy sheet passes between rollers 16 and 17 supported by sides of the cabinet. Roller 16 is driven via a gear train 18, 19, 20 and a toothed rubber belt 25. The belt 25 is driven by gear 26 on the shaft 27 of motor 28. The belt 25 also drives the geared end 23 of an opaque hollow cylindrical drum member 30. This drum is supported by rotation in a bearing in wall 11 and in a ring bearing 21 secured to base 13. Drum 30 has a single turn relatively wide continuous helical slot 31 and carries a continuous one turn helical mirror 32 disposed to collect light entering the slot to direct it to a phototube or photocell 33. The tube is mounted on a base 34 which contains appropriate conventional circuit connections so that electrical signals which are obtained on conductors 35 are representative of light signals obtained from copy C.

Copy C is illuminated by two elongated fluorescent type lamps 8. The lamps are supported at the sides of the cabinet parallel to each other and spaced a predetermined distance to flood with light a fixed scanning line S located between the lamps on copy C. The lamps are energized via conductors 24, 25. A lens system 40 supported in a frame 41 carried by bracket 42 is disposed to focus the scanning line S on a narrow linear slit or window 45 in a flat opaque plate 46. The plate is disposed so that it is substantially tangential to the member 47. This member is a hollow opaque cylinder provided with a continuous narrow helical slit or window 48. The slit 48 has two or more turns so that it intersects the linear slit 45 at a plurality of points to define a plurality of quadrilateral scanning apertures. Since it is generally desired that light from only a single scanning aperture be directed to the photocell the turn-selecting member 30 with its single turn slot is provided.

Member 47 rotates freely in a journal bearing 50 attached to wall 11. Member 47 has a geared end 51 which is driven by a toothed rubber belt 52 and gear 53 from motor shaft 27. The drum 30 is arranged to rotate inside member 47 at a rate $$\frac{1}{N}$$

times the speed of drum 47 where N is the number of turns of the helical window 48. Thus for each full traverse of straight window 45 by helical window 48, the single turn slot 31 traverses the same linear distance once. The geometry of the intersecting slits and slot and their relative rates of rotation are such that a single scanning area A repeatedly traverses the straight window 45. Slot 31 is considerably wider than window 48 so that selection of the desired turn is facilitated.

In operation the motor 29 keeps the copy sheet moving continuously past the scanning line S. The scanning line is focused via lens system 40 on a plane at or close to the linear window. Such a plane would preferably be one intersected by mirror 32 so that the scanning line S would be reflected as continuously moving elemental areas to the photocell.

Fig. 2 shows an interior view of the turn selector-light collector member. Slot 31 should be wide enough to permit light passing the scanning aperture A to reach the angularly disposed helical mirror 32 whose reflecting surface R is inclined to the curved surface of drum 30 and wholly covers the slot 31 to intercept all light entering the slot. At the end of drum 30 is the shaft 22 attached to head 43. The shaft rotatably supports the drum on wall 11. Shaft 22 rotates in the bearing 29 in wall 11.

Figs. 3 and 4 illustrate a convenient way of forming the helical window 48. A long narrow strip of film F such as photographic film has a single narrow straight transparent slit or window L disposed thereon. The remaining area P of the film is opaque. When the film is wound on and cemented to the hollow cylinder 47, the line L takes on a helical configuration to form the continuous multiturn transparent helical window 48. Cylinder 47 should be made of some transparent material such as glass or plastic.

In Fig. 5 the cylindrical scanning member 47 with helical window 48 is shown disposed and rotated within turn selector cylinder 30 which is rotated by belt 52. Belt 25 will rotate the cylinder 47 in a manner similar to that shown in Fig. 1 for member 30. In Fig. 6 the turn selector is shown as a flat disk 30A in which is located the single turn spiral slot 31A. Fig. 7 shows another scanner assembly in which the linear window 45 is embodied in a stationary cylindrical member 46A that is concentric with the rotatable scanning members 30, 47.

The scanner assemblies of Figs. 1, 5, 6, 7 may all be used in flying spot facsimile recorders. In Fig. 1 tube 33 may be a source of light modulations derived from signals received via conductors 35. A light beam will then be reflected from helical mirror 32 and through scanning aperture A to copy sheet C. A spot of light will repeatedly traverse scanning line S on copy sheet C as the scanning members rotate. If the sheet is light sensitive it will record graphically the light signals emitted by the tube 33. Lamp 59 in Figs. 5, 6, 7 may also serve as a source of modulated light so that the assemblies of Figs. 5, 6 and 7 may each operate as flying spot generators in a facsimile recorder.

Fig. 8 shows another form of turn selector-light collector scanner member. The one turn continuous helical mirror 32A is supported on a shaft 22A by radial spokes 61 joined to the side of the mirror opposite the reflecting side R. One end of the mirror is attached to a spider ring 62. Shaft 22A extends beyond the ring for support and rotation in wall 11 of the cabinet. The other end of the mirror is secured to cylindrical spider 63. The selector-collector will rotate inside cylinder 47 in place of the selector-collector member 30 shown in Fig. 1. The shaft 22 terminates in a gear 62 for rotation by belt 25 while cylinder 63 may extend beyond cylinder 47 to be journaled in bearing 21.

The operation of the selector-collector of Fig. 8 is illustrated in Fig. 8A wherein the photocell 33 receives a light beam B from the one turn helical mirror 32A as it is rotated between positions $P_1$ and $P_2$ adjacent to the linear window 45 and multiturn helical window 48 of the scanner members 46 and 47 respectively. It will be noted that no additional lens system is required between the selector-collector and the photocell to focus the beams because the curved mirror acts as light collecting element.

Figs. 9, 9A show another form of turn selector-light collector which includes a flat disk 30B. The disk is preferably made of transparent material. A one turn continuous flat spiral 36 is cut or molded in one side of the disk and the remainder of that side is coated with an opaque film or layer 70. This groove has a flat floor or bottom G which gradually decreases in slope with respect to the flat plane sides of the disk from the ends T, T' of the spiral 36 to an intermediate point H. The slope of the floor G in section T—H is opposite in sense to slope of the floor in section H—T' as shown in Fig. 9A. This selector-collector may be substituted for the selector disk 30A and lens 40 shown in Fig. 6 but a more efficient utilization is illustrated in Fig. 9A where the multiturn spiral window is in the form of a flat spiral embodied in a flat disk 47'. Such a disk is described in both my copending applications above mentioned. As shown in Fig. 9A light beam B is bent when it passes through disk 30B. The amount of bending is determined by the degree of slope of floor G, and the light beam is focused on photocell 33. Thus the disk 30B includes a spiral lens which is useful in collecting light and focusing it on the photocell and the disk also acts as a turn selector to select the particular scanning aperture focused on the photocell. Disk 30B must of course be rotated at a rate $$\frac{1}{N}$$

times the rate of rotation of disk 47' where window 48 has N turns.

In Fig. 10 is shown another form of turn selector-light collector which includes a plurality of one turn continuous helical mirrors 32A. The mirrors are oriented 90° apart for a four element selector-collector member. The member may be disposed inside cylinder 47 in place of the selector-collector 30 in Fig. 1. As many mirror elements should be used as there are turns in the helical window 48. A plurality of spaced photocells 33 are provided, one for each selector-collector element. Each mirror surface M of each mirror 32A will reflect a light beam $B_1$, $B_2$, $B_3$, and $B_4$ from a different one of the scanning apertures to its corresponding photocell 33 as shown in Fig. 10A.

In Fig. 11 the flat disk 30C is a selector-collector similar to the disk 30B. Disk 30C includes a plurality of one turn continuous flat spiral lenses 36 radiating from a common center and oriented equal angular distances apart. The points $H_1$, $H_2$, $H_3$, $H_4$ of reversal of inclination of the floors of lenses 36 are shown in Fig. 11A. Each lens 36 is identical to that shown in Fig. 9. Although this selector-collector may be used instead of the disk 30 and lens 40 in the assembly of Fig. 6, a more efficient utilization is shown in Fig. 11A where as in Fig. 9A, the window 48 is in the form of a multiturn flat spiral in disk 47'. Each lens 36 transmits a beam ($B_1$—$B_4$) from a particular scanning aperture to a corresponding photocell 33 in a manner analogous to the system of Fig. 10A. Disk 30C should include as many spiral lenses 32A as there are turns in window 48 in order that the light beam passing through all the scanning apertures defined by the spiral and straight windows may be utilized. Disk 30C will of course be rotated at $$\frac{1}{N}$$

times the rate of rotation of member 47.

Although four lenses and mirrors are shown in the selector members of Figs. 10, 11, more or less may be used depending on the number of turns of window 48.

The scanner assemblies of Figs. 1, 5, 6, 7 may be used in facsimile recorders or in facsimile transmitters. For transmission purposes it may be desirable to modulate at a fixed frequency the light emitted by lamps 8 to generate a carrier signal for the signal transmitted by the photocell 33. When the assemblies of Figs. 5, 6 or 7 are used in transmitters similar to the assembly of Fig. 1 lamp 59 is not required.

Scanner assemblies employing the multielement selector-collector of Figs. 10 or 11 may be used in color facsimile systems. In such systems each light beam $B_1$—$B_4$ may be filtered by a different color filter 72 as shown in Figs. 10A, 11A before it reaches its corresponding photocell 33 to accomplish color separation where multicolor copy is scanned. The same type of multielement selector-collector may be used in a color facsimile recorder to receive and record the transmitted color signals. The tubes 33 shown in Figs. 10A, 11A may then represent modulated light sources and copy C may be photographic color film.

In a black and white facsimile transmission system the multielement selector-collector may serve the useful purpose of transmitting and receiving the copy in a plurality of channels. Such a multichannel ssytem will require a smaller frequency bandwidth than copy transmitted in single channel.

In this specification the terms "helical," "helix" and "cylindrical helix" are limited in application to a curve formed on any cylinder by a straight line in a plane that is wrapped round the cylinder, like a screw-thread. The term "flat spiral" when used herein refers to the curved path of a point that moves round an axis while continually receding from or approaching it. The term "spiral" is used generically herein to refer to both a flat spiral and a cylindrical helix.

What is claimed and desired to protect by Letters Patent of the United States is:

1. A scanning assembly for a facsimile system, comprising a rotatable opaque cylindrical member having a narrow multiturn helical window disposed in an optical path, said window being continuously transparent from end to end thereof, a fixed opaque member having a narrow linear window disposed to intersect the helical window in said path, the intersection of the windows defining a plurality of quadrilateral scanning apertures in said path, opposite sides of each of the apertures being formed by elemental portions of the helical and linear windows respectively, another rotatable opaque member having a single turn continuous spiral aperture disposed to expose a single one of said scanning apertures in said path, and means for rotating the two rotatable members in coordination with each other so that said single scanning aperture repeatedly traverses a single line across the optical path.

2. A scanning assembly for a facsimile system, comprising a rotatable opaque cylindrical member having a narrow multiturn helical window disposed in an optical path, said window being continuously transparent from end to end thereof, a fixed opaque member having a narrow linear window disposed to intersect the helical window in said path, the intersection of the windows defining a plurality of quadrilateral scanning apertures in said path, opposite sides of each of the apertures being formed by elemental portions of the helical and linear windows respectively, another rotatable opaque cylindrical member having a single turn continuous helical aperture disposed to expose a single one of said scanning apertures in said path, and means for rotating the two rotatable members in coordination with each other so that said single scanning aperture repeatedly traverses a single line across the optical path.

3. A scanning assembly for a facsimile system, comprising a rotatable opaque cylindrical member having a narrow helical window disposed in an optical path, said window being continuously transparent from end to end thereof, a fixed opaque member having a narrow linear window disposed to intersect the helical window in said path, the intersection of the windows defining a plurality of quadrilateral scanning apertures in said path, opposite sides of each of the apertures being formed by elemental portions of the helical and linear windows respectively, a rotatable opaque flat disk having a single turn continuous spiral aperture disposed to expose a single one of said scanning apertures in said path, and means for rotating the two rotatable members in coordination with each other so that said single scanning aperture repeatedly traverses a single line across the optical path.

4. A scanning assembly for a facsimile system, comprising a rotatable opaque cylindrical member having a narrow multiturn helical window disposed in an optical path, said window being continuously transparent from end to end thereof, a fixed flat opaque member disposed substantially tangential to said cylindrical member and having a narrow linear window disposed to intersect the helical window in said path, the intersection of the windows defining a plurality of quadrilateral scanning apertures in said path, opposite sides of each of the apertures being formed by elemental portions of the helical and linear windows respectively, another rotatable opaque member having a single turn continuous spiral aperture disposed to expose a single one of said scanning apertures in said path, and means for rotating the two rotatable members in coordination with each other so that said single scanning aperture repeatedly traverses a single line across the optical path.

5. A scanning assembly for a facsimile system, comprising a rotatable opaque cylindrical member having a narrow multiturn helical window disposed in an optical path, said window being continuously transparent from end to end thereof, a fixed curved opaque member having a narrow linear window disposed to intersect the helical window in said path, the intersection of the windows defining a plurality of quadrilateral scanning apertures in said path, opposite sides of each of the apertures being formed by elemental portions of the helical and linear windows respectively, another rotatable opaque member having a single turn continuous spiral aperture disposed to expose a single one of said scanning apertures in said path, and means for rotating the two rotatable members in coordination with each other so that said single scanning aperture repeatedly traverses a single line across the optical path.

6. A scanning assembly for a facsimile system, comprising a rotatable opaque member having a continuous multiturn spiral window, disposed in an optical path, a fixed opaque member having a linear window disposed in said path to intersect the spiral window and define a plurality of scanning apertures therewith and another rotatable member disposed in said path, said other rotatable member including means for selecting at least one of said scanning apertures to transmit light therethrough and for collecting the light transmitted through the selected scanning aperture.

7. A scanning assembly for a facsimile system, comprising a rotatable cylindrical opaque member having a continuous multiturn spiral window disposed in an optical path, a fixed opaque member having a linear window disposed in said path to intersect the spiral window and define a plurality of scanning apertures therewith, and another rotatable cylindrical member disposed in said path, said other rotatable member including means for selecting at least one of said scanning apertures to transmit light therethrough and for collecting the light transmitted through the selected scanning aperture.

8. A scanning assembly for a facsimile system, comprising a rotatable opaque member having a continuous multiturn spiral window disposed in an optical path, a fixed opaque member having a linear window disposed in said path to intersect the spiral window and define a plurality of scanning apertures therewith, and another rotatable cylindrical member disposed in said path, said other member including a one turn helical slot for selecting at least one of said scanning apertures to transmit light therethrough and further including a helical mirror disposed adjacent to the slot for collecting the the light transmitted through the selected scanning aperture.

9. A scanning assembly for a facsimile system, comprising a rotatable opaque member having a continuous multiturn spiral window disposed in an optical path, a fixed opaque member having a linear window disposed in said path to intersect the spiral window and define a plurality of scanning apertures therewith, and a single turn rotatable helical mirror disposed in said path, for selecting at least one of said scanning apertures to transmit light therethrough and for collecting the light transmitted through the selected scanning aperture.

10. A scanning assembly for a facsimile sysem, comprising a rotatable opaque member having a continuous multiturn spiral window disposed in an optical path, a fixed opaque member having a linear window disposed in said path to intersect the spiral window and define a plurality of scanning apertures therewith, and a plurality of single turn rotatable helical mirrors disposed in said path for selecting particular ones of said scanning apertures to transmit light therethrough and for collecting the light transmitted through the selected scanning apertures.

11. A scanning assembly for a facsimile system, comprising a rotatable opaque member having a continuous multiturn spiral window disposed in an optical path, a fixed opaque member having a linear window disposed in said path to intersect the spiral window and define a plurality of scanning apertures therewith, and a flat opaque disk including at least one rotatable single turn spiral lens disposed in said path for selecting at least one of said scanning apertures to transmit light therethrough and for collecting the light transmitted through the selected scanning aperture.

12. A scanning assembly for a facsimile system, comprising a rotatable opaque member having a continuous multiturn spiral window disposed in an optical path, a fixed opaque member having a linear window disposed in said path to intersect the spiral window and define a plurality of scanning apertures therewith, and a flat opaque disk including a plurality of single turn spiral lenses disposed in said path for selecting particular ones of said scanning apertures to transmit light therethrough and for collecting the light transmitted through the selected scanning apertures.

13. A facsimile system comprising a rotatable opaque cylindrical member having a continuous multiturn helical window, a fixed opaque member having a linear window disposed to intersect the helical window to define a plurality of scanning apertures, a rotatable selector-collector member disposed to select at least one of said scanning apertures for transmission of light therethrough and to collect light transmitted through the selected aperture, at least one phototube, a copy sheet holder including means for continuously moving a copy sheet past a fixed scanning line, means for illuminating said line, means for focusing said selected aperture on said scanning line, and means for rotating said rotatable members in coordination with each other, with said scanning line and phototube disposed at the ends of a continuous optical path and with the selected scanning aperture disposed in the optical path.

14. A facsimile transmitting system according to claim 13, wherein the phototube produces electrical pulses corresponding to varying light pulses originating at the copy sheet and impinging on the phototube.

15. A facsimile recording system according to claim 13, wherein the phototube emits modulated light pulses corresponding to graphic images for recording on the copy sheet.

16. A facsimile system comprising a rotatable opaque cylindrical member having a continuous multiturn helical window, a fixed opaque member having a linear window disposed to intersect the helical window to define a plurality of scanning apertures, a rotatable selector-collector member disposed to select certain ones of said scanning apertures for transmission of light therethrough and to collect light transmitted through the selected apertures, a plurality of phototubes, a copy sheet holder including means for continuously moving a copy sheet past a fixed scanning line, means for illuminating said line, means for focusing said selected apertures on said scanning line, and means for rotating said rotatable members in coordination with each other, with said scanning line and phototubes disposed at the ends of a plurality of continuous optical paths and with the selected scanning apertures disposed in the optical path.

17. A facsimile system as in claim 16, further comprising a color filter disposed in each of said optical paths adjacent each of the photctubes, whereby said system is a color facsimile system.

18. A color facsimile receiver system according to claim 17, wherein the phototubes emit modulated light pulses corresponding to graphic images for recording colored images on the copy sheet.

19. A color facsimile transmitter according to claim 17, wherein the phototubes produce electrical pulses corresponding to varying colored light pulses originating at the copy sheet and impinging on the phototubes.

References Cited in the file of this patent

UNITED STATES PATENTS

| | | |
|---|---|---|
| 1,859,828 | Jenkins | May 24, 1932 |
| 1,862,455 | Barnecut | June 7, 1932 |
| 2,287,413 | Bruce | June 23, 1942 |
| 2,529,978 | Thompson | Nov. 14, 1950 |